United States Patent
Araki

[11] Patent Number: 5,908,270
[45] Date of Patent: Jun. 1, 1999

[54] MULTI-SPINDLE MACHINING APPARATUS AND MULTI-SPINDLE MACHINING METHOD

[75] Inventor: Osamu Araki, Kikuchi-gun, Japan

[73] Assignee: Ohashi & Associates, Tokyo, Japan

[21] Appl. No.: 09/013,738

[22] Filed: Jan. 27, 1998

[30] Foreign Application Priority Data

Feb. 4, 1997 [JP] Japan ...................................... 9-21146

[51] Int. Cl.⁶ ........................... B23B 39/16; B23B 35/00; B23B 41/12; B23B 47/16
[52] U.S. Cl. .............................. 408/1 R; 408/42; 408/53; 408/707; 408/128; 409/131
[58] Field of Search ................. 408/1 R, 42, 43, 408/53, 707, 128; 409/131, 132, 203, 213, 217

[56] References Cited

U.S. PATENT DOCUMENTS 3,749,507 7/1973 Haley ........................................ 408/53
3,765,787 10/1973 Hart et al. .................................. 408/53

*Primary Examiner*—Steven C. Bishop
*Attorney, Agent, or Firm*—Schwegman, Lundberg, Woessner & Kluth, P.A.

[57] ABSTRACT

The present invention relates to the multi-splindle machining apparatus which carries out machining of the discontinuous surfaces of a plurality of workpieces simultaneously, and in order to restrain the amplification of chattering, oscillation or the like so as to prevent the machining precision from deterioration, the diameters of plural drive pulleys 7a, 7b, 7c connected to a driving motor are finely varied to change at random the rotational speeds which are transmitted from the drive pulleys 7a, 7b, 7c through belts 10 to driven pulleys 8 provided on each machining spindle 3a, thus changing irregularly the timings at which cutting edges 9 of the machining spindles 3a pass the discontinuities such as joint portions s.

4 Claims, 5 Drawing Sheets

MULTI-SPINDLE MACHINING APPARATUS AND MULTI-SPINDLE MACHINING METHOD

BACKGROUND OF THE INVENTION

1. Field of the Invention

The present invention relates to a multi-spindle machining apparatus for and a multi-spindle machining method of finishing internal cylindrical surfaces of workpieces such as connecting rods, for example, which are employed in engines for motor vehicles.

2. Description of Related Art

Hitherto, there is known such a type of multi-spindle machine tool that, when machining internal cylindrical surfaces of openings of the connecting rods for use in the motor vehicle engines, for example, it carries out machining works of such internal cylindrical surfaces of the plural connecting rods simultaneously by each cutting edge provided on a plurality of machining spindles which are rotated together through a common driving source. With these multi-spindle machines, firstly a rough broaching or a rough boring, then a finish-boring and lastly an internal honing as an super-finishing process, for example, are in turn taken place simultaneously with respect to the plurality of connecting rods.

By the way, a large end of the connecting rod is divided into a cap portion and a body portion and hence formed with discontinuities at joint portions s,s between the cap portion and the body portion, as seen in FIG. 6. The discontinuity is also formed by an oil hole h open to the internal cylindrical surface of the large end. The reason why the super-finish honing as described above is inevitably applied to the connecting rods resides in that due to the discontinuities a predetermined surface roughness and circularity of the internal machining surface of the large end may not be obtained through the finishing process, as seen in FIG. 6(A). Namely, when the cutting edge passes the joint portions s,s and the oil hole h, the chattering or oscillation is susceptible to being developed, and when the plurality of connecting rods are fixed in position in the same posture and machined by the cutting edges of the same phase of rotation, the chattering or the like is amplified, since the plurality of the cutting edges pass almost at the same time the discontinuous portions.

When shifting the phases of rotation of the cutting edges with respect to each of the connecting rods so as to adjust the timings, at which the cutting edges pass the discontinuities, to be differed from each other, the petalous swells are susceptible to being developed periodically or cyclically along the circumferential direction, as illustrated in FIG. 6(B), and the improved effect is not obtained so much. Thus, it is desired to provide such a machining art that the predetermined surface roughness and circularity are capable of being obtained without super-finishing, in the case where the plurality of workpieces with a discontinuity on the surface to be machined are simultaneously machined by the multi-spindle machine tool.

SUMMARY OF THE INVENTION

It is therefore an object of the present invention to provide an improved machining art which is capable of simultaneously machining at a predetermined level of finishing precision a plurality of workpieces each formed with a discontinuity on the surface to be machined.

With a view to accomplishing the object described above, a multi-spindle machining apparatus of the present invention adapted to machine at the same time and in the same shape a plurality of workpieces, each formed with a discontinuity on the surface to be machined, comprising a plurality of machining spindles, cutting means provided on each of the machining spindles to machine the workpieces, a driving source for rotating the machining spindles together with each other, and phase shift means provided between the driving source and each of the machining spindles so as to change irregularly the phase of rotation of each machining spindle.

As referred to hereinabove, when the cutting edges of each spindle pass the discontinuities regularly, the chattering or the like generated at such timings that each of the cutting edges passes discontinuities is amplified thereby to deteriorate the surface roughness or the like. When shifting the phases of rotation of the cutting edges with respect to the workpieces and changing the timings at which the cutting edges pass the discontinuities, the small swells are produced at regularly repeated cycles and this is little effective measure to lessen the chattering or the like.

Hence, the phase shift means are provided between the driving source and each of the machining spindles for shifting at random the rotation speeds of the machining spindles so that timings at which the cutting edges pass the discontinuities may be shifted to be irregular thereby preventing the repeat of the same cycle. Thus, if the discontinuity passing times are shifted to be irregular, the chattering or the like may be restrained from amplification, whereby the machining precision such as surface roughness or the like may be improved.

In a preferred form of the present invention, a multi-spindle machining apparatus comprises a plurality of drive pulleys operatively connected to the driving source, a plurality of driven pulleys provided on each of the machining spindles, and a plurality of driving belts extending between each of the drive pulleys and each of the driven pulleys for transmitting a rotation power from the driving source to each of the machining spindles, wherein the phase shift means are formed by varying the external diameter of each of the drive pulleys or the external diameter of each of the driven pulleys. When the drive pulleys are made different in external diameters from each other, or when the driven pulleys are made different in external diameters, the rotation power from the driving source is transmitted to the machining spindles in different rotation speeds, respectively, whereby the phases of rotation for the machining spindles may be shifted. In this case, merely by varying the external diameters of the drive or driven pulleys, without changing other component parts, the machining precision may be effectively improved.

In another form of the invention, the phase shift means comprise the drive pulleys and the driven pulleys formed respectively with toothed pulleys, and the driving belts which are formed with timing belts. In this case, the number of teeth is different with respect to each of the pulleys and each of driving belts so as to change the rotational speed of each machining spindle.

According to another aspect of the present invention, a multi-spindle machining method of machining at the same time and in the same shape a plurality of workpieces, each formed with a discontinuity on the surface to be machined, by each of cutting means provided on a plurality of machining spindles which are operated by a common driving source, comprises the step of varying irregularly the phase of rotation with respect to each of the machining spindles so as to shift irregularly the timings at which each of the cutting means passes the discontinuity, while machining the surfaces of the workpieces by the cutting means of the machining spindles. With the application of this method, the chattering or the like are effectively restrained and the machining precision such as the surface roughness or the like may be improved.

The above and other objects and the attendant advantages of the present invention will become apparent by reference to the following detailed description when considered with accompanying drawings.

DETAILED DESCRIPTION OF PREFERRED EMBODIMENT

Referring now to FIGS. 1 to 4, the multi-spindle machining apparatus 1 according to the present invention is constructed in such a form of a machine tool that it is suitable for simultaneously machining a plurality of connecting rods W for use in motor vehicle engines.

Figure 4:
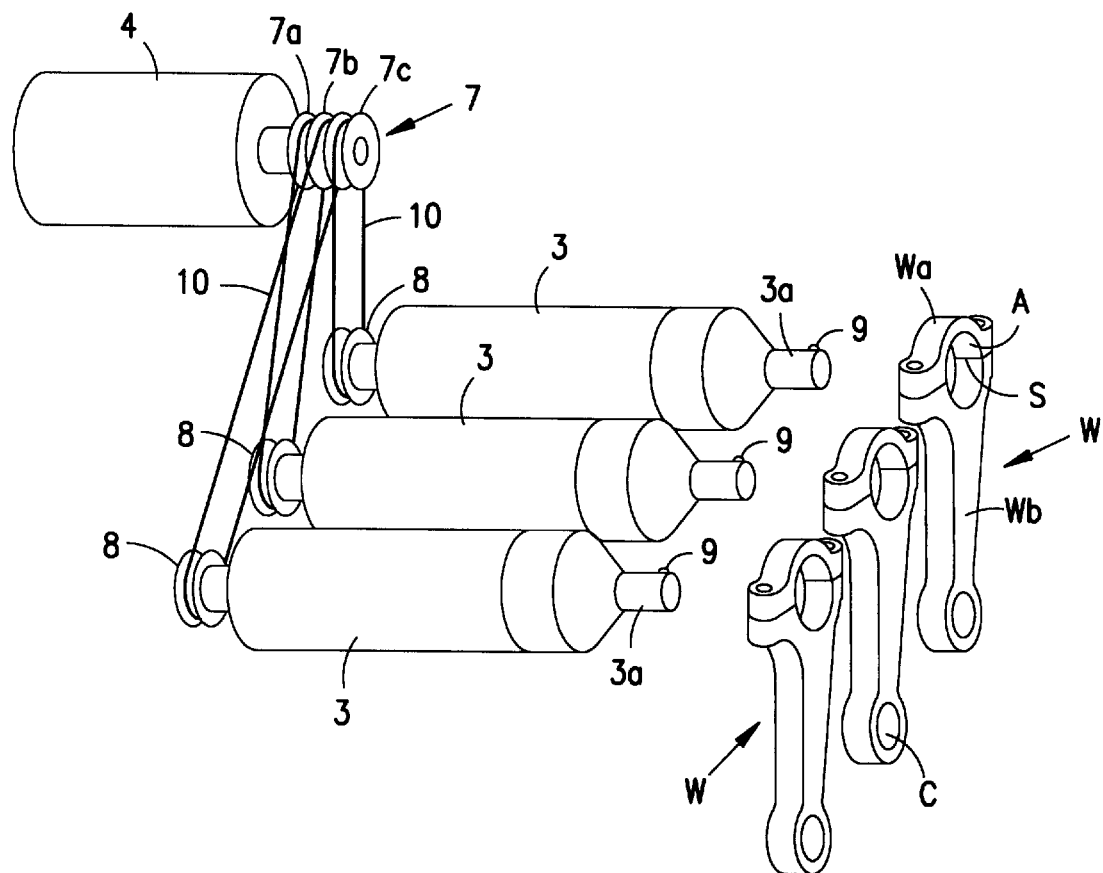
FIG. 4 is a perspective view, schematically illustrating the condition in which a plurality of connecting rods are machined.

As seen in FIG. 4, each of the connecting rods W is provided with an opening a of large diameter on the side of a large end and with an opening c of small diameter on the side of a small end. The large end is divided into two pieces comprising a cap portion Wa and a body portion Wb, so that discontinuous portions such as joint portions s or the like are formed on the internal cylindrical machining surface of the large end. This multi-spindle machine 1 is so formed as to carry out machining of the internal cylindrical surfaces of the large openings a along with the internal cylindrical surfaces of the small openings c substantially at the same time with respect to the three connecting rods W which are fixed in position to extend vertically in the axial direction thereof.

Figure 1:
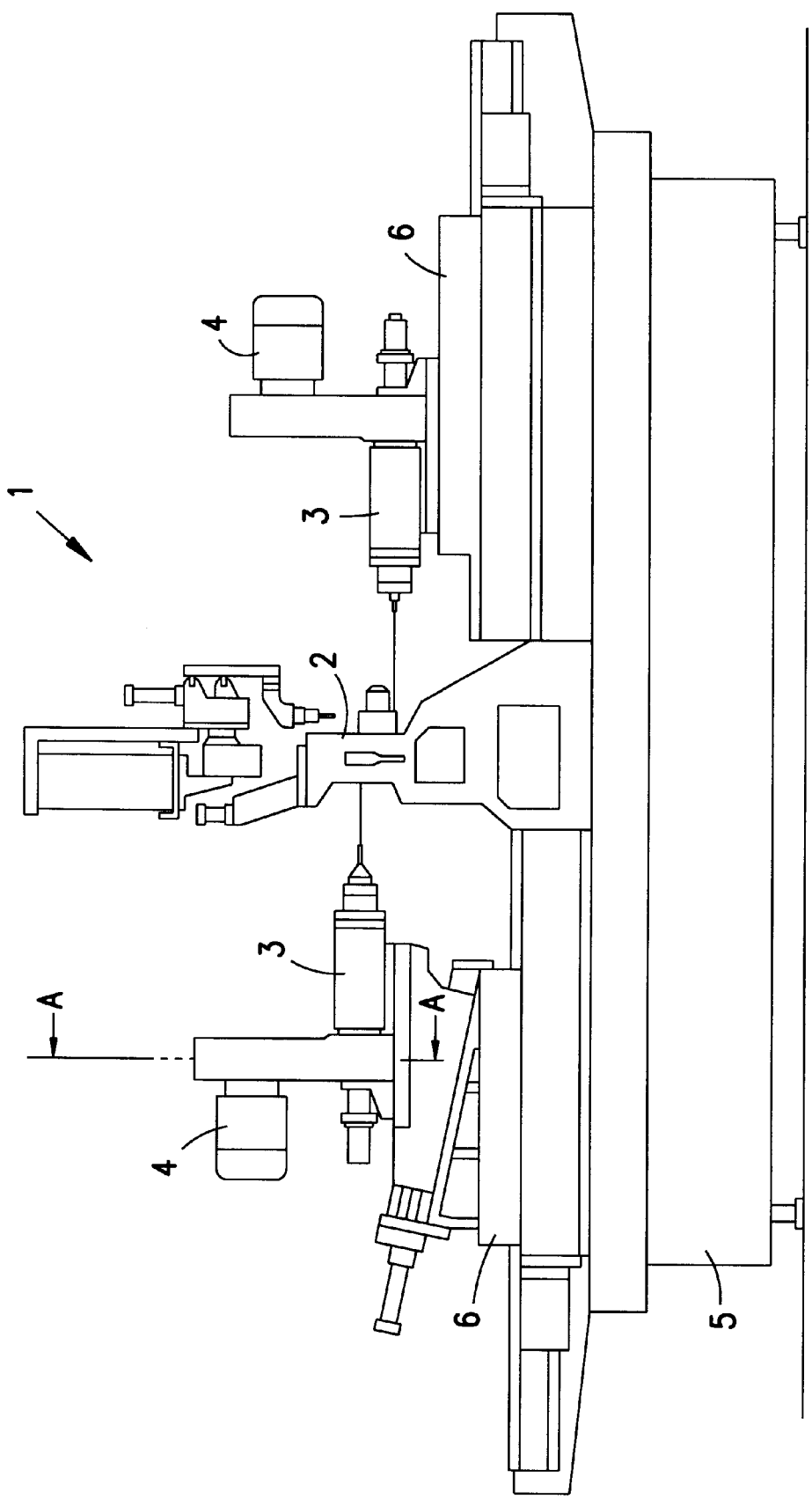
FIG. 1 is a side view of a multi-spindle machining apparatus in accordance with the present invention.
Figure 2:
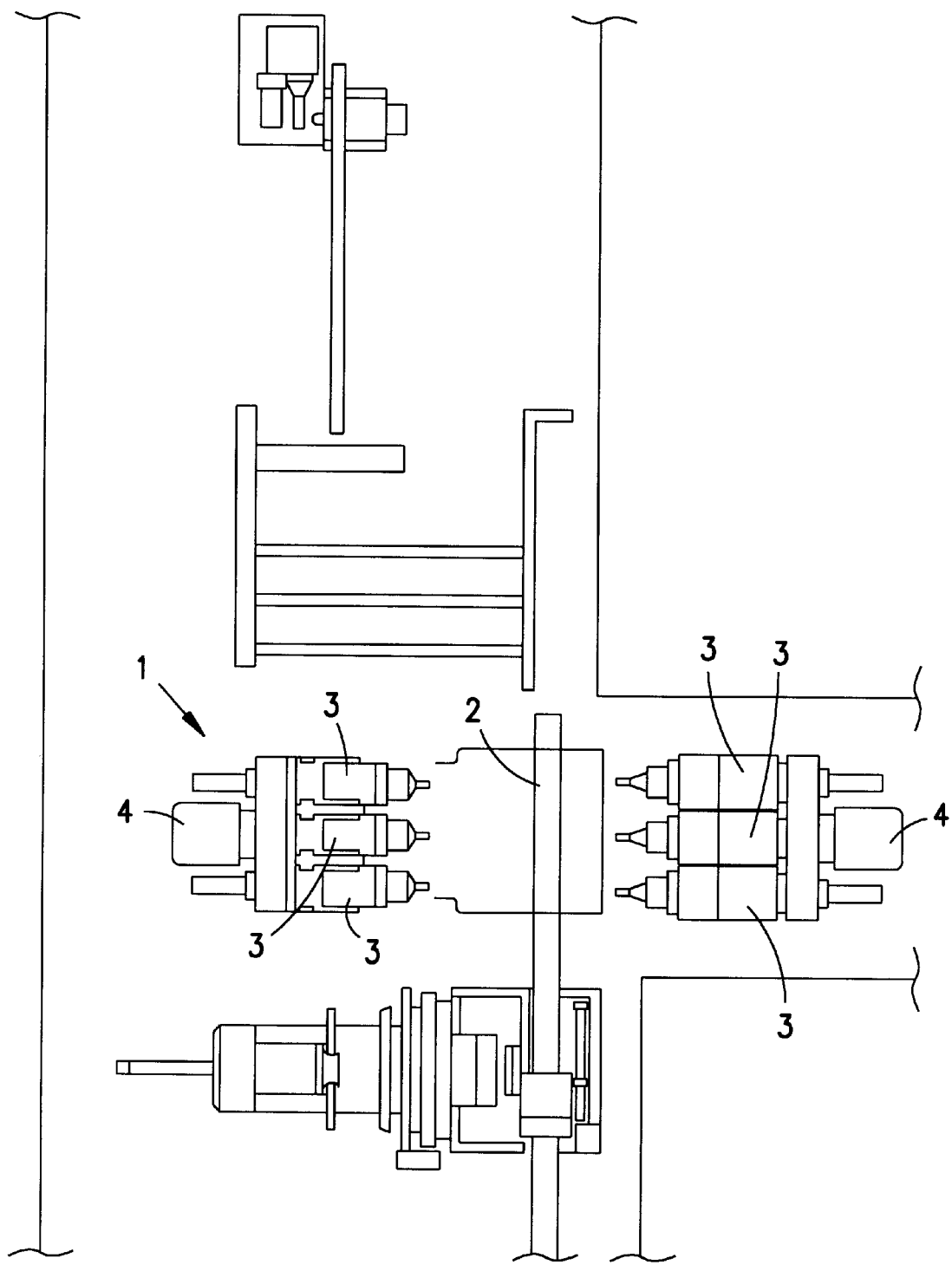
FIG. 2 is a plan view of the multi-spindle machining apparatus.

Namely, as seen in FIGS. 1 and 2, a pair of triple-spindle machining units 3, 3 are symmetrically arranged on a right and a left sides with respect to a positioning portion 2 of the connecting rods W in such a manner that the large openings a are machined by the machining unit 3 provided on one side and the small openings c are machined by the machining unit 3 on the other side. A pair of driving motors 4, 4 are arranged on the right and left sides as a power source for operating each of the right and left triple-spindle machining units 3, 3. The rotational driving force from each of the driving motors 4, 4 is thus transmitted to three machining spindles 3a, 3a of each of the machining units 3, 3. The machining units 3, 3 are mounted on right and left tables 6, 6, respectively, which are movable forwards and backwards on a base 5.

Figure 3:
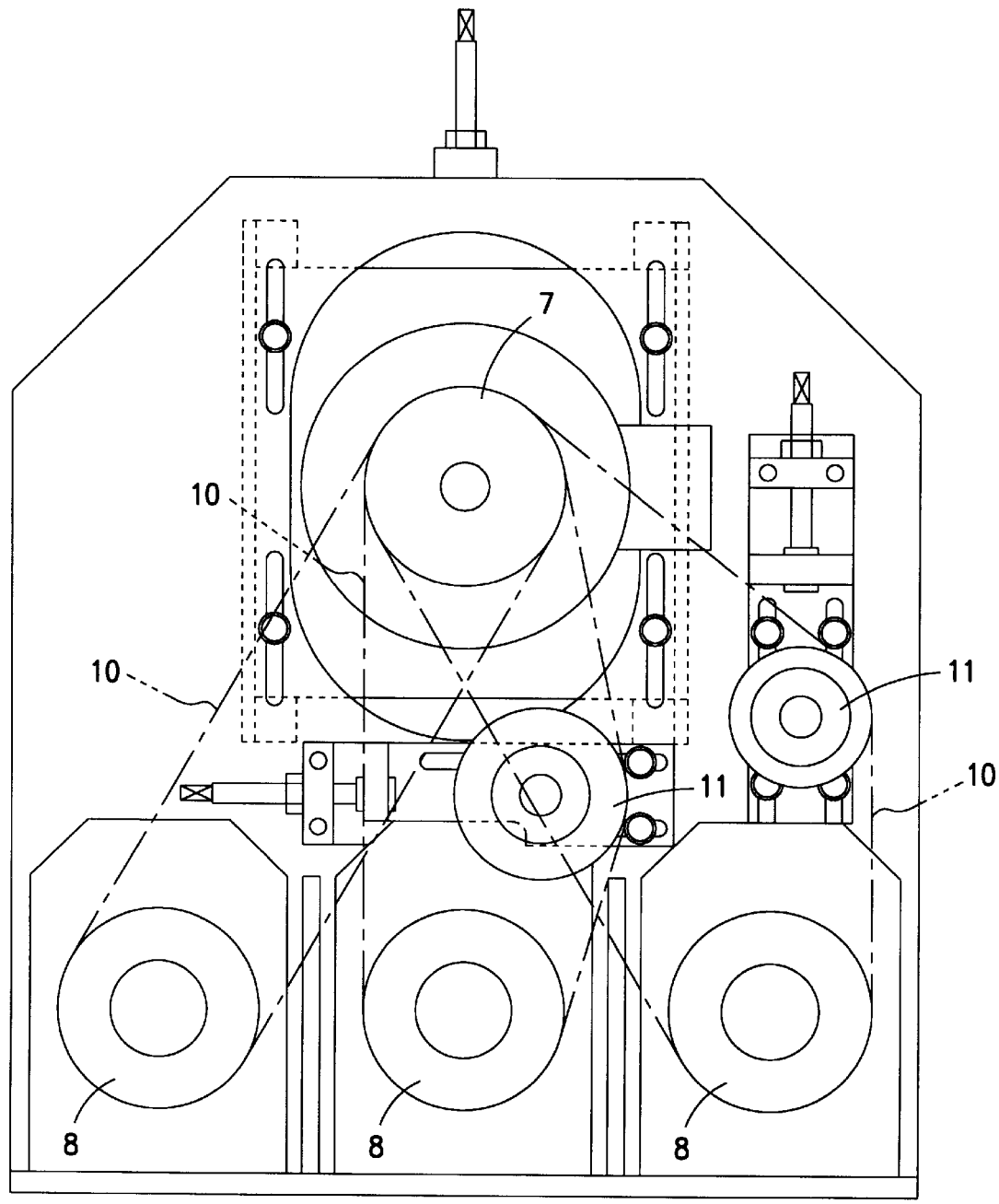
FIG. 3 is a sectional view, taken along the line A—A of FIG. 1.

The means for transmitting the rotation of the driving motors 4, 4 to each of the machining units 3, 3 will be explained hereunder in detail with reference to FIGS. 3 and 4. Fixedly secured to the output shaft of the driving motor 4 is a drive pulley 7 which is axially divided into three sections to form three pulley portions 7a, 7b, 7c. Three driven pulleys 8, 8 are fixedly secured to the proximal ends of the machining spindles 3a, 3a of each of the machining units 3, 3. On the distal end of each of the machining spindles 3a, 3a there is provided a cutting edge 9. Belts 10 extend between the pulley portions 7a, 7b, 7c of the drive pulley 7 and the driven pulleys 8, respectively, in an operatively connecting relationship. Two of the belts 10 are capable of being maintained under tension by each of tension rollers 11, 11, as seen in FIG. 3.

Upon setting, the drive motor 4 is set in position at first relative to the belt 10 of the machining unit 3 without a tension roller, and thereafter other two belts 10, 10 of the machining unit 3 are set in position through the positional adjustment of the tension rollers 11, 11.

Figure 5:
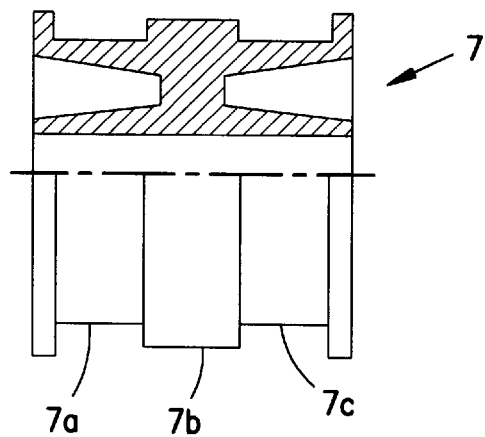
FIG. 5 is an explanatory view of a drive pulley as a phase shift means.
Figure 6:
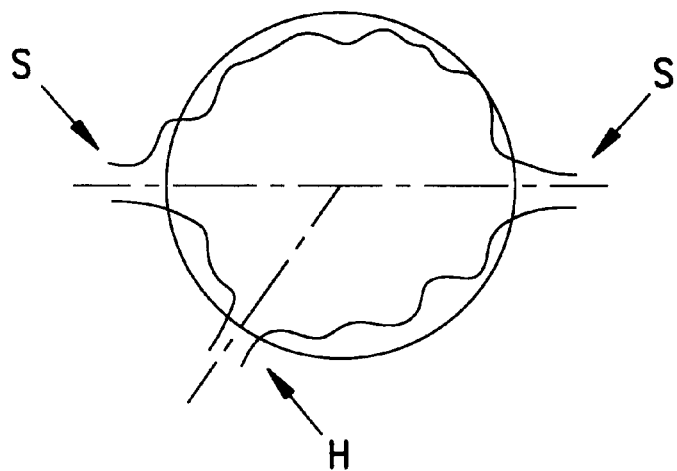
FIGS. 6(A), (B) are explanatory views illustrating the conditions of surfaces machined in the conventional manner.
Figure 6:
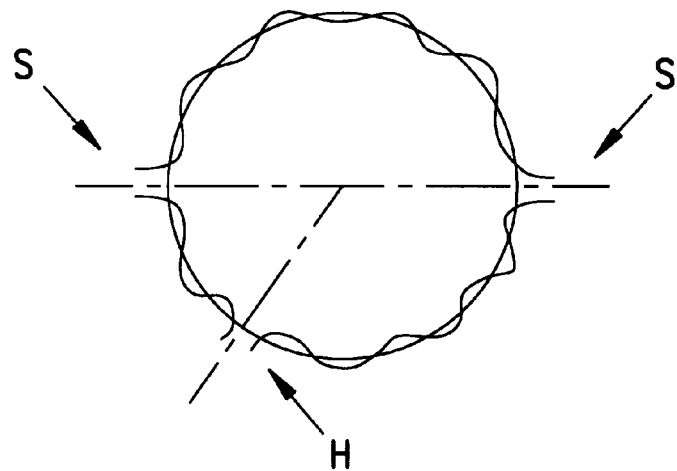

Referring to the drive pulleys 7 on the driving motors 4, the respective pulley portions 7a, 7b, 7c of the drive pulley 7 provided on the right side of FIG. 1 for machining the small openings c are formed identical in diameter with each other, while the pulley portions 7a, 7b, 7c of the drive pulley 7 on the left side of FIG. 1 for machining the large openings a are formed finely different in diameter with each other like FIG. 5 so as to function as phase shift means. The upper half above a center horizontal dotted line of FIG. 5 is illustrated as a sectional view of the pulley 7, while the lower half shows an external configuration thereof. The rotation of the driving motor 4, therefore, is transmitted in finely different rotation to each of the machining spindles 3a, 3a of the left side machining unit 3 thereby irregularly changing the phase of rotation with respect to each of the machining spindles 3a. Incidentally, as seen from the sectional illustration of FIG. 5, the middle portion of the drive pulley 7 is hollowed out to reduce the weight, but that has no particular relation to the present invention.

The operation of the above-described multi-spindle machining apparatus will now be explained hereunder. Three pieces of the connecting rods W are set in position on the positioning portion 2 in the vertical upright posture thereof so as to carry out the machining of the internal cylindrical surfaces of the large openings a. Namely, the machining spindles 3a, 3a of the machining unit 3 are rotated by the force of the driving motor 4 and carried forwards in accordance with movement of the table 6 whereby the internal cylindrical surfaces of the large openings a are machined simultaneously by each of the cutting edges 9. Then, the rotations of the machining spindles 3a are irregularly controlled different from each other due to the function of the phase shift means, and hence the cutting edges 9 pass the discontinuities such as the joint portions s or the like at random timings so that the amplification of resonance or the like may be restricted thereby to improve the machining precision such as the surface roughness and circularity or the like. When finishing the internal cylindrical surfaces in the aforementioned machining method, the predetermined surface roughness and circularity are capable of being obtained merely by the application of the finishing process. Accordingly, the super-finish honing which is inevitably required after finishing process in the conventional machining method can be omitted or dispensed with. After finishing the large openings a, then the machining of the internal cylindrical surfaces of the small openings c is carried out substantially in like manner as described above with respect to the large openings a. They also may be done in the reverse order.

While the invention has been described in its preferred embodiment, it is to be understood that the pulley portions 7a, 7b, 7c of the drive pulley 7 may be replaced with three independent pulleys, that the drive pulley 7 may be formed with V-shaped grooves instead of the afore-mentioned example, and that the phase shift means may be formed by changing the diameters of the driven pulleys 8 to be different from each other, instead of changing the diameters of the respective pulley portions 7a, 7b, 7c of the drive pulley 7. It is also possible to change a number of rotation with respect to each of the machining spindles 3a, 3a by replacing the pulleys 7 and 8 with toothed pulleys and by using timing belts.

As described above, the multi-spindle machining apparatus according to the present invention is adapted to simultaneously machine a plurality of workpieces with a discontinuity on the surface to be machined thereof. The phase shift means is provided between the power source and each of the machining spindles so as to shift irregularly the phase of rotation of each of the machining spindles. The timings at which the cutting means pass the discontinuity, therefore, can be changed irregularly so as to restrain the amplification of the chattering or the oscillations, thus improving the machining precision. Further, since the phase shift means can be made by changing the external diameter of the drive pulleys or of the driven pulleys, there may be easily used the existing facilities without making substantial changes.

What is claimed is:

1. A multi-spindle machining apparatus adapted to machine at the same time and in the same shape a plurality of workpieces, each formed with a discontinuity on the surface to be machined, comprising a plurality of machining spindles, cutting means provided on each of said machining spindles to machine the workpieces, and a driving source for rotating said machining spindles together with each other, characterized in that phase shift means are provided between said driving source and each of said machining spindles so as to change irregularly the phase of rotation of each machining spindle.

2. An apparatus according to claim 1, comprising a plurality of drive pulleys operatively connected to said driving source, a plurality of driven pulleys provided on each of said machining spindles, and a plurality of driving belts extending between each of said drive pulleys and each of said driven pulleys for transmitting a rotation power from said driving source to each of said machining spindles, wherein said phase shift means are formed by varying the external diameter of each of said drive pulleys or the external diameter of each of said driven pulleys.

3. An apparatus according to claim 1, comprising a plurality of drive pulleys operatively connected to said power source, a plurality of driven pulleys provided on each of said machining spindles, and a plurality of driving belts extending between each of said drive pulleys and each of said driven pulleys for transmitting a rotation power from said driving source to each of said machining spindles, wherein said phase shift means comprise said drive pulleys and said driven pulleys formed respectively with toothed pulleys, and said driving belts which are formed with timing belts.

4. A multi-spindle machining method of machining at the same time and in the same shape a plurality of workpieces, each formed with a discontinuity on the surface to be machined, by each cutting means provided on a plurality of machining spindles which are operated by a common driving source, comprising the step of varying irregularly the phase of rotation with respect to each of the machining spindles so as to shift irregularly the timings at which each of said cutting means passes the discontinuity.

* * * * *

UNITED STATES PATENT AND TRADEMARK OFFICE
CERTIFICATE OF CORRECTION

PATENT NO. : 5,908,270
DATED : June 1, 1999
INVENTOR(S) : Osamu Araki

It is certified that error appears in the above-identified patent and that said Letters Patent is hereby corrected as shown below:

Title Page, [73] Assignee: please delete "Ohashi & Associates, Tokyo, Japan" and insert --Honda Giken Kogyo Kabushiki Kaisha, Tokyo, Japan--.

Signed and Sealed this

Twenty-ninth Day of February, 2000

*Attest:*

Q. TODD DICKINSON

*Attesting Officer*    Commissioner of Patents and Trademarks